(12) United States Patent
Lentz

(10) Patent No.: US 8,768,534 B2
(45) Date of Patent: Jul. 1, 2014

(54) METHOD AND APPARATUS FOR USING ELECTRONIC FLIGHT BAG (EFB) TO ENABLE FLIGHT OPERATIONS QUALITY ASSURANCE (FOQA)

(71) Applicant: ARINC Incorporated, Annapolis, MD (US)

(72) Inventor: Robert Lewis Lentz, Pasadena, MD (US)

(73) Assignee: ARINC Incorporated, Annapolis, MD (US)

( * ) Notice: Subject to any disclaimer, the term of this patent is extended or adjusted under 35 U.S.C. 154(b) by 0 days.

(21) Appl. No.: 13/676,850

(22) Filed: Nov. 14, 2012

(65) Prior Publication Data

US 2013/0124018 A1 May 16, 2013

Related U.S. Application Data

(60) Provisional application No. 61/559,332, filed on Nov. 14, 2011.

(51) Int. Cl.
*G06F 17/00* (2006.01)
*G01C 23/00* (2006.01)
*G08G 5/06* (2006.01)
*G08G 5/00* (2006.01)

(52) U.S. Cl.
CPC ............... *G01C 23/00* (2013.01); *G08G 5/065* (2013.01); *G08G 5/0013* (2013.01)
USPC .......................................................... 701/1

(58) Field of Classification Search
CPC ................... B64D 2045/0075; G08G 5/0021; G08G 5/065; G08G 5/0013; G01C 23/00; G01C 21/00
USPC ........... 701/3, 120, 532; 340/945, 971; 244/2, 244/12.4, 17.13, 54, 118.5, 119, 178, 431, 244/570; 239/171; 370/310
See application file for complete search history.

(56) References Cited

U.S. PATENT DOCUMENTS

| | | | | |
|---|---|---|---|---|
| 7,203,630 | B2* | 4/2007 | Kolb et al. | 703/6 |
| 7,312,725 | B2* | 12/2007 | Berson et al. | 340/980 |
| 7,437,220 | B2 | 10/2008 | Stefani | |
| 7,620,374 | B2* | 11/2009 | Ziarno et al. | 455/98 |
| 7,982,767 | B2* | 7/2011 | Berson et al. | 348/144 |
| 2005/0187677 | A1* | 8/2005 | Walker | 701/16 |
| 2006/0025899 | A1* | 2/2006 | Peckham et al. | 701/3 |
| 2008/0039997 | A1* | 2/2008 | Kolb et al. | 701/35 |
| 2009/0198392 | A1* | 8/2009 | Eicke et al. | 701/3 |

* cited by examiner

*Primary Examiner* — McDieunel Marc
(74) *Attorney, Agent, or Firm* — Ronald E. Prass, Jr.; Prass LLP

(57) ABSTRACT

A method for using an Electronic Flight Bag (EFB) located on an aircraft to communicate Flight Operations Quality Assurance (FOQA) data to a remote aircraft flight data collection unit is provided. The method is directed to receiving FOQA data from one or more aircraft systems with an EFB on an aircraft while the aircraft is in-flight, and automatically transmitting the received FOQA data from the EFB to a remote aircraft flight data collection unit for analysis.

14 Claims, 6 Drawing Sheets

METHOD AND APPARATUS FOR USING ELECTRONIC FLIGHT BAG (EFB) TO ENABLE FLIGHT OPERATIONS QUALITY ASSURANCE (FOQA)

PRIORITY INFORMATION

This non-provisional application claims priority from U.S. Provisional Application Ser. No. 61/559,332, filed, Nov. 14, 2011, the content of which is incorporated herein by reference in its entirety.

BACKGROUND OF THE DISCLOSED EMBODIMENTS

1. Field of the Disclosed Embodiments

The disclosed embodiments relate to electronic flight bags (EFBs) for aircraft.

2. Introduction

Conventional aircraft systems require a hardware device, a Quick Access recorder (QAR) to be installed to facilitate the collection of Flight Operations Quality Assurance (FOQA) data. This information is used to determine the occurrence of an event or the parameters surrounding an event and this data is only accessible after the flight is completed. In addition it is a manual process to physically remove these data from the QAR.

An example of the type of data that might be collected is for the A300 aircraft where severe wind turbulence can cause severe tail cracks. The specific data that might be recorded included wind turbulence data accompanied by corresponding strain gauge data within the tail section itself. Data may be collected and the post-flight data analyzed to determine if fatigue or imminent failure is a potential problem before that incident occurs.

The issue is that the data must be physically removed from the aircraft and forwarded to the activity doing the analysis. Because of this the data is not available in a timely manner and cannot be analyzed so that an imminent problem can be dealt with. If the data is delivered in a more timely and efficient manner the effectiveness of monitoring programs can be improved.

SUMMARY OF THE DISCLOSURE

A method for using an Electronic Flight Bag (EFB) located on an aircraft to communicate Flight Operations Quality Assurance (FOQA) data to a remote aircraft flight data collection unit, is disclosed. The method may include receiving FOQA data from one or more aircraft systems while the aircraft is in-flight, and automatically transmitting the received FOQA data to a remote aircraft flight data collection unit for analysis.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DESCRIPTION OF THE DISCLOSED EMBODIMENTS

Figure 1:
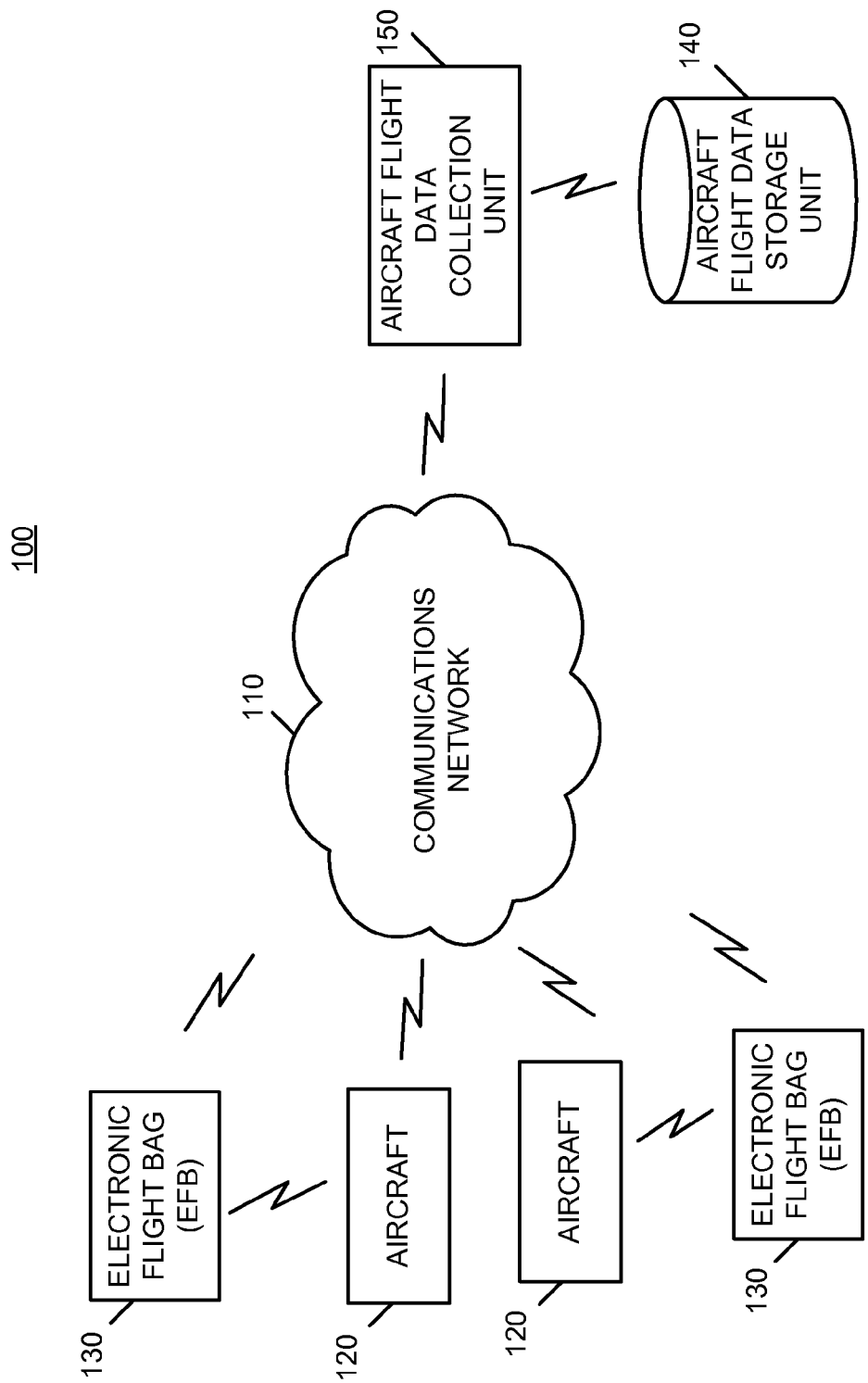
FIG. 1 is diagram of an exemplary aircraft FOQA data management environment in accordance with a possible embodiment of the disclosure.

Additional features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations particularly pointed out in the appended claims. These and other features of the present disclosed embodiments will become more fully apparent from the following description and appended claims, or may be learned by the practice of the disclosed embodiments as set forth herein.

Various embodiments of the disclosed embodiments are discussed in detail below. While specific implementations are discussed, it should be understood that this is done for illustration purposes only. A person skilled in the relevant art will recognize that other components and configurations may be used without parting from the spirit and scope of the disclosed embodiments.

The disclosed embodiments comprise a variety of embodiments, such as a method and apparatus and other embodiments that relate to the basic concepts of the disclosed embodiments. Note that while this disclosure discusses aircraft and airline uses for the disclosed embodiments, the disclosed embodiments by no means are limited to that technology area and may be applied to a wide variety of environments and uses.

The disclosed embodiments use an onboard Electronic Flight Bag (EFB) for the transfer of aircraft or external sensor Flight Operations Quality Assurance (FOQA) data. FOQA is a voluntary safety program designed to improve aviation safety through the proactive use of flight recorded data. Operators will use these data to identify and correct deficiencies in all areas of flight operations. Properly used, FOQA data can reduce or eliminate safety risks, as well as minimize deviations from regulations. Through access to de-identified aggregate FOQA data, the Federal Aviation Administration (FAA) can identify and analyze national trends and target resources to reduce operational risks in the National Airspace System (NAS), Air Traffic Control (ATC), flight operations, and airport operations.

The EFB may provide the trigger for sending pertinent FOQA data off the aircraft using available communications. This EFB transmittal of data could also be initiated by external means if an event occurs or in-flight emergency is declared. This transmittal of data may be automated based on rules that would be set up on the EFB and be transparent and independent of other actions the flight crew need to take during a potentially critical time.

Conventional implementations of the QAR allow the data to be physically downloaded once the aircraft has landed. This may be via a laptop or storage device being connected to the QAR and must be collected and then disseminated for further analysis.

However, the disclosed embodiments use the functionality of an Electronic Flight Bag (EFB) computer on the aircraft aggregate and transmit FOQA data. This would eliminate having to manually download these data post flight and physically have to access the QAR. The EFB can collect these data off of the aircraft's data busses (such as ARINC 429, ARINC 717, Mil-Std-1553 or aircraft discrete signals). The EFB may transmit these data off-aircraft via one of the networks installed on the aircraft. If the aircraft is equipped with gatelink type Wi-Fi or 3G connections (as would be the case with most EFB equipped aircraft) the aircraft can begin downloading FOQA data automatically upon landing and parking at an airport gate. The idea is using a general purpose processor to incorporate the functionality of a QAR and then extend its functionality in a way in which with the QAR is not possible.

In conventional aircraft systems, no equipment on the aircraft has the capability of collecting and processing flight QAR data and coordinating its transfer to the ground for post processing. The lack of a suitable data link connection, such as is employed with an EFB has always been another impediment to the implementation of such a capability.

The functionality of the QAR maybe incorporated and extended within a Class 2 or Class 3 EFB. The EFB may function as an additional processing element to collect, analyze and disseminate FOQA data. A Class 2 EFB may be considered as a situation where the equipment is considered installed but must be portable and removable without special tooling. A Class 3 EFB may be considered as a situation where the equipment is permanently installed in the aircraft and is under design review. A Class 2 or Class 3 EFB may be installed under a Supplemental Type Certificate (STC) or other airworthiness approval.

Since the EFB can collect and monitor FOQA data during a flight it is conceivable that particular configurable flight parameters can be monitored in the course of a flight and if parameter is exceeded it can be sent immediately via one of the aircraft data links used by the EFB. The EFB can also send particular data if it is triggered by an external event. This event could be a switch that the flight crew selects, for example. Relevant data leading up to or after the event could be sent via the data links as well.

Particular messages from the ground could also be devised that would request other data to be sent from the aircraft if required in the troubleshooting of a problem for instance. This option may allow the airline to remove the hardware QAR from the aircraft avionics suite since this functionality would be handled within the EFB.

FIG. 1 is diagram of an exemplary aircraft FOQA data management environment in accordance with a possible embodiment of the disclosure. The aircraft FOQA data management environment 100 may include one or more aircraft 120 each having one or more Electronic Flight Bags (EFBs) 130, and an aircraft flight data collection unit 150 connected to the communications network 110. The aircraft flight data collection unit 150 may include the automatic analysis (or technically-assisted analysis) of an aircraft's flight data in real-time and the storing of and/or access to an aircraft flight data storage unit 140 which may in turn be used by one or more aircraft system technicians or managers for real-time or future analysis. Although the connections in FIG. 1 are shown as a wireless configuration, one or more of these connections may also be wired.

Communications network 110 may represent any communications network used to communicate with other entities, including the Internet, an intranet, a radio network, a wireless network, etc. Note that a hub, router, switch, server, computer, or any other device that may serve as an intermediate communication routing device between the communications network 110 and the aircraft 120 (or EFB 130) or the aircraft flight data collection unit 150.

The aircraft flight data collection unit 150 may be any server, computer, processing device, personal digital assistant (PDA), or other similar device capable of storing and managing media publications and other documents and products. The aircraft flight data storage unit aircraft flight data storage unit 140 may serve to store flight data and analysis data, etc. known to one of skill in the art. One or more technicians, managers, government regulators or personnel, etc., may have access to the aircraft flight data storage unit 140, as required.

Figure 2:
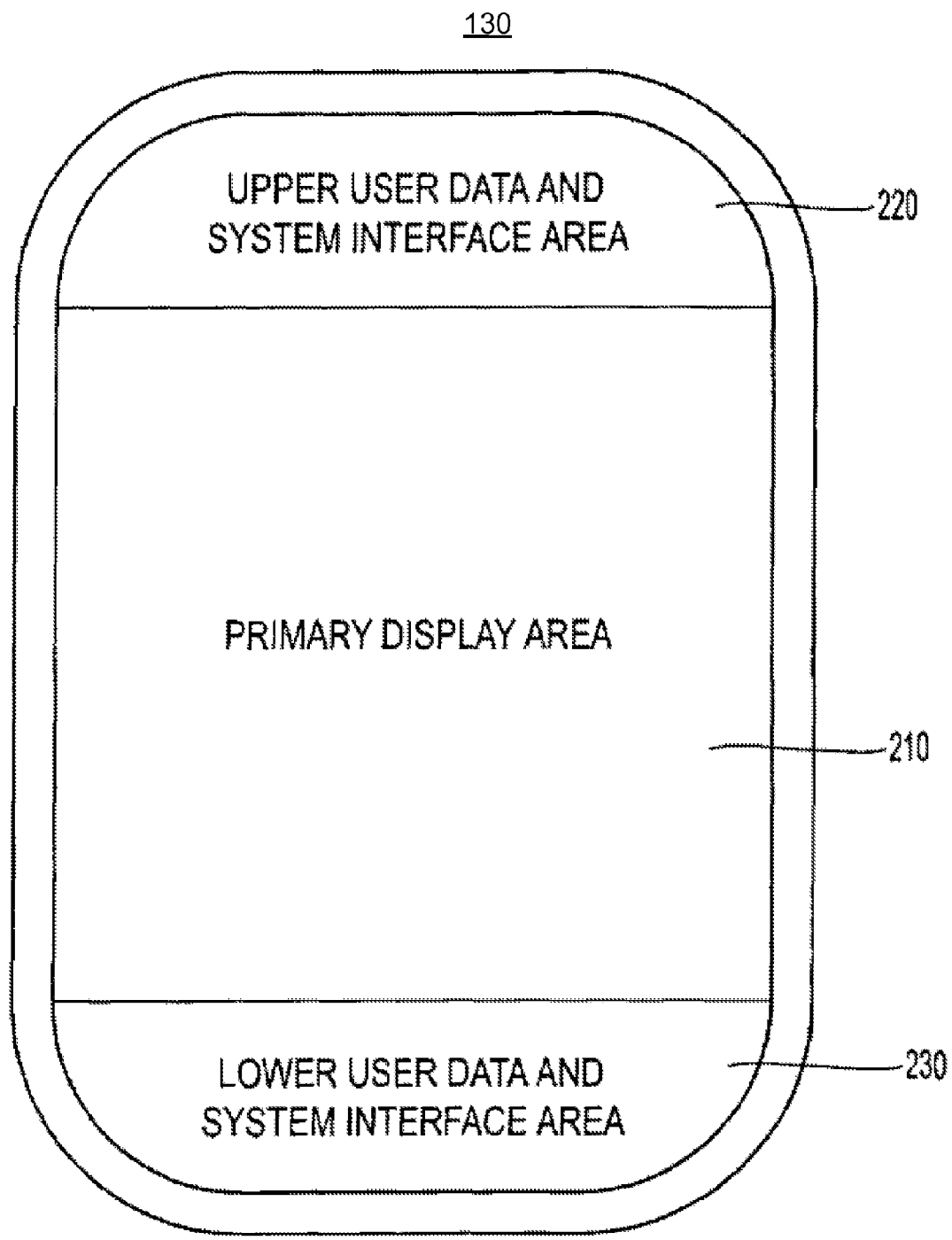
FIG. 2 is a diagram of an exemplary electronic flight bag in accordance with a possible embodiment of the disclosure.

FIG. 2 illustrates an exemplary embodiment of an EFB 130 in accordance with a possible embodiment of the disclosure. The exemplary EFB 130 may include a primary data display area 210, an upper user data and system interface area 220, and a lower user data and system interface area 230, for example. The upper and lower user data and system interface areas 220, 230, may be located in an exemplary manner in the top and bottom three quarters of an inch of the overall display area, may be ordinarily hidden and are dedicated to receive user input and present options to a user for manipulating the data to be displayed on the primary display area 210 of the EFB 130. These upper and lower user data and system interface areas 220, 230 may normally be hidden allowing the primary display area 210 to extend to the limits of the overall display area. The overall display area of the EFB 130 may be touched in either of the upper and lower user data and system interface areas 220, 230, to enable menu choices to be presented to the individual cockpit flight crew member facilitating manipulation and control of the data to be displayed on the EFB 130.

The primary display area 210, which, as noted above, may generally overlap the upper and lower user data and system interface areas 220,230, and can be used to display any one of tens of thousands of static (e.g., text and still pictures), dynamic (e.g., video and/or audio), and/or interactive (e.g., checklists and forms) pages of data stored in the reference library of the EFB 130. Such pages of data displayed normally in the primary display area 210 include, for example, required checklists, aircraft operating manuals, navigation charts and/or publications and other like pages of reference materials required for operation and navigation of the aircraft under normal and emergency conditions. An individual cockpit flight crew member can simply review the information presented which is critical to the immediate phase of flight. Alternatively, in the case of checklists, these are often available in an interactive manner such that, as individual steps in the checklist are completed, the individual cockpit flight crew member can "check-off" the step in an interactive manner by manipulating the display of the EFB 130. The resulting indication for the "check-off" of the step can then be displayed not only on the EFB 130 of the individual cockpit flight crew member who verified accomplishment of the step, but the "check-off" indication can be immediately and coincidentally displayed on the EFBs of the other individual cockpit flight crew members who had the checklist up for display at that given time based on the interaction of the EFBs 130 and communication therebetween.

With respect to the disclosed embodiments, the EFB 130 may receive FOQA data, status updates, and other system data from various aircraft systems while in the air and on the ground. The EFB 130 may also run an internal status or diagnostic check on itself to determine if any malfunctions or problems exist in the hardware or software implementations. If any problems exist according to the aircraft 120 or the aircraft's systems, those problems may be identified by the aircraft flight data collection unit 150 for action. An automated diagnostic unit or technician 140 may then review the problem and send a solution (e.g., electronic signal or written instructions) or troubleshooting instructions to the EFB 130 through the aircraft flight data collection unit 150 and the communications network 110. The problem may be automatically corrected via the electronic signal to the EFB 130 requiring no human intervention. The electronic signal may be relayed to another EFB 130 or to the malfunctioning aircraft system, for example. Otherwise, the pilot or aircrew may be given instructions via the EFB 130 on how to fix or further troubleshoot the problem.

Figure 3:
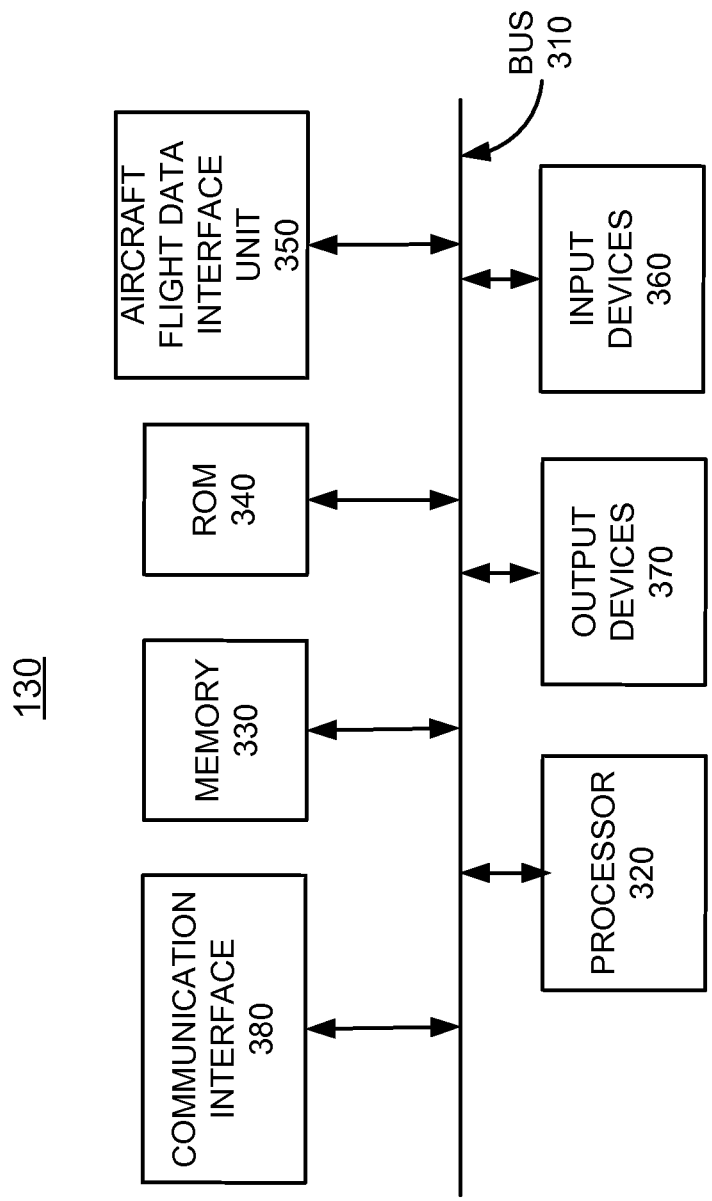
FIG. 3 is an exemplary block diagram of an electronic flight bag in accordance with a possible embodiment of the disclosure.

FIG. 3 is a block diagram of an exemplary EFB 130 in accordance with a possible embodiment of the disclosure. The exemplary EFB 130 may include bus 310, processor 320, memory 330, read only memory (ROM) 340, aircraft flight data interface unit 350, input devices 360, output devices 370, communication interface 380, and self-diagnostic unit 390. Bus 310 may permit communication among the components of the EFB 130.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Memory 330 may also represent any storage device that may include any type of media, such as, for example, magnetic or optical recording media and its corresponding drive.

Input devices 360 may include one or more conventional mechanisms that permit a user to input information to the EFB 130, such as a keyboard, a mouse, a pen, a voice recognition device, etc. Output devices 370 may include one or more conventional mechanisms that output information to the user, including a display, a printer, one or more speakers, or a medium, such as a memory, or a magnetic or optical disk and a corresponding disk drive.

Communication interface 380 may include any transceiver-like mechanism that enables the EFB 130 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. In some implementations of the EFB 130, communication interface 380 may not be included in the exemplary EFB 130 when the content management process is implemented completely within the EFB 130.

The EFB 130 may perform such functions in response to processor 320 by executing sequences of instructions contained in a computer-readable medium, such as, for example, memory 330, a magnetic disk, or an optical disk. Such instructions may be read into memory 330 from another computer-readable medium, such as a storage device, or from a separate device via communication interface 380.

Figure 4:
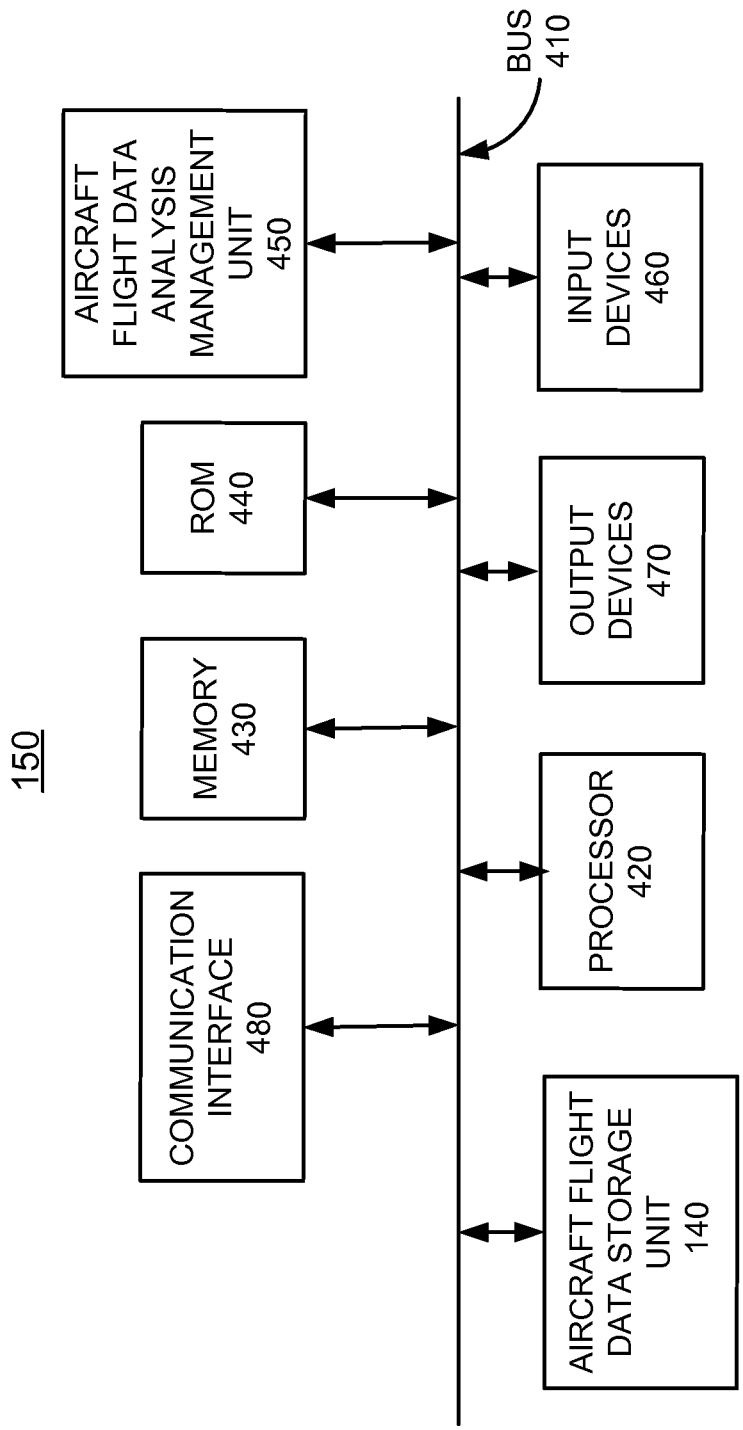
FIG. 4 is an exemplary block diagram of an aircraft flight data collection unit in accordance with a possible embodiment of the disclosure.

FIG. 4 is an exemplary block diagram of a remote aircraft flight data collection unit 150 in accordance with a possible embodiment of the disclosure. The exemplary aircraft flight data collection unit 150 may include bus 410, processor 420, memory 430, read only memory (ROM) 440, aircraft flight data analysis management unit 450, input devices 460, output devices 470, communication interface 480, automated aircraft system diagnostic unit 490, and one or more aircraft system documentation and publication databases 160. Bus 410 may permit communication among the components of the aircraft flight data collection unit 150.

Processor 420 may include at least one conventional processor or microprocessor that interprets and executes instructions. Memory 430 may be a random access memory (RAM) or another type of dynamic storage device that stores information and instructions for execution by processor 420. Memory 430 may also store temporary variables or other intermediate information used during execution of instructions by processor 420. ROM 440 may include a conventional ROM device or another type of static storage device that stores static information and instructions for processor 420. Memory 430 may also represent any storage device that may include any type of media, such as, for example, magnetic or optical recording media and its corresponding drive.

Input devices 460 may include one or more conventional mechanisms that permit a user to input information to the aircraft flight data collection unit 150, such as a keyboard, a mouse, a pen, a voice recognition device, etc. Output devices 470 may include one or more conventional mechanisms that output information to the user, including a display, a printer, one or more speakers, or a medium, such as a memory, or a magnetic or optical disk and a corresponding disk drive.

Communication interface 480 may include any transceiver-like mechanism that enables the aircraft flight data collection unit 150 to communicate via a network. For example, communication interface 480 may include a modem, or an Ethernet interface for communicating via a local area network (LAN). Alternatively, communication interface 480 may include other mechanisms for communicating with other devices and/or systems via wired, wireless or optical connections. In some implementations of the aircraft flight data collection unit 150, communication interface 480 may not be included in the exemplary aircraft flight data collection unit 150 when the content management process is implemented completely within the aircraft flight data collection unit 150.

The aircraft flight data storage unit 140 may serve to store aircraft flight data, analysis, and other materials, etc. known to one of skill in the art. Note that the aircraft flight data storage unit 140 may be separate or stored in the memory 430, for example.

The aircraft flight data collection unit 150 may perform such functions in response to processor 420 by executing sequences of instructions contained in a computer-readable medium, such as, for example, memory 430, a magnetic disk, or an optical disk. Such instructions may be read into memory 430 from another computer-readable medium, such as a storage device, or from a separate device via communication interface 480.

The aircraft solution management environment 100, the EFB 130, and the aircraft flight data collection unit 150 illustrated in FIGS. 1-4 and the related discussion are intended to provide a brief, general description of a suitable computing environment in which the disclosure may be implemented.

Although not required, the disclosure will be described, at least in part, in the general context of computer-executable instructions, such as program modules, being executed by the EFB 130 and the aircraft flight data collection unit 150, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

For illustrative purposes, the operation of the aircraft flight data interface unit 350 and the aircraft flight data analysis management unit 450 will be described in the flowcharts below in FIGS. 5 and 6, respectively, in relation to the diagrams shown in FIGS. 1-4.

Figure 5:
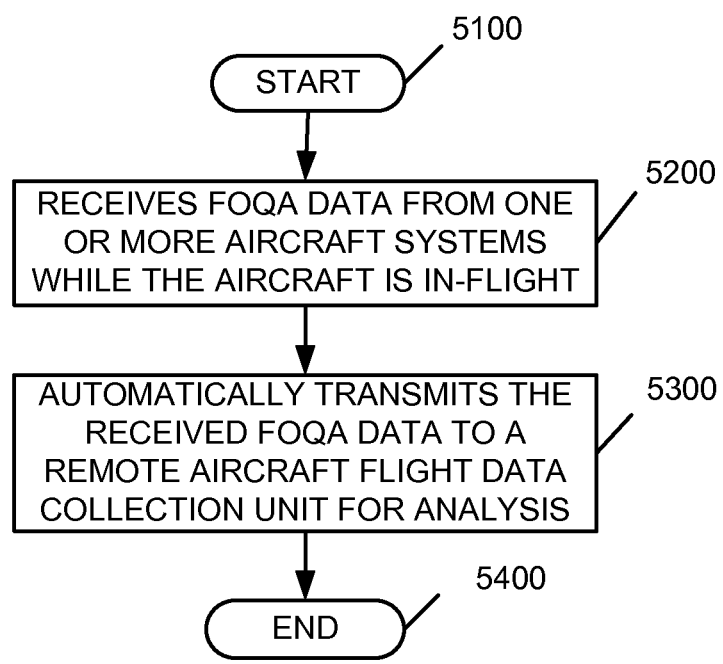
FIG. 5 is an exemplary flowchart illustrating one possible aircraft flight data interface process in accordance with one possible embodiment of the disclosure.

FIG. 5 is an exemplary flowchart illustrating one possible aircraft flight data interface process in accordance with one possible embodiment of the disclosure. The process may begin at step 5100 and may continue to step 5200 where the aircraft flight data interface unit 350 may FOQA data from one or more aircraft systems while the aircraft 120 is in-flight.

At step 5300, the aircraft flight data interface unit 350 may automatically transmit the received FOQA data to a remote aircraft flight data collection unit 150 for analysis through the communication interface 380. The process may then go to step 5400 and end.

The aircraft flight data interface unit 350 may also receive information concerning any identified problems related to the FOQA data from the remote aircraft flight data collection unit 150. The information may concern a solution to the identified problems from the remote aircraft flight data collection unit 150 and the aircraft flight data interface unit 350 may implement the received solution which may include outputting the solution to at least one of the aircraft's pilot and crewmembers or automatically implementing the solution to the identified problems using the EFB 130, for example.

Figure 6:
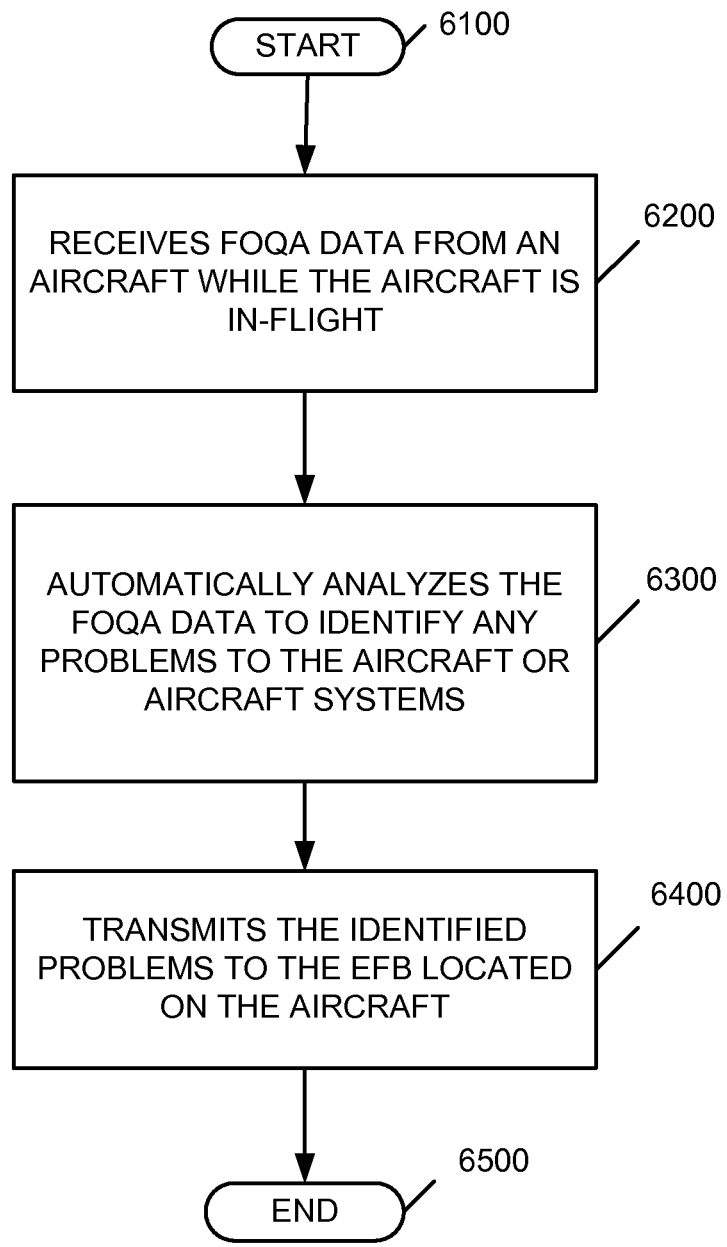
FIG. 6 is an exemplary flowchart illustrating one possible aircraft flight data analysis management process in accordance with one possible embodiment of the disclosure.

FIG. 6 is an exemplary flowchart illustrating one possible aircraft flight data analysis management process in accordance with one possible embodiment of the disclosure. The process may begin at step 6100 and may continue to step 6200 where the aircraft flight data analysis management unit 450 may receiving FOQA data from an aircraft 120 while the aircraft is in-flight. At step 6300, the aircraft flight data analysis management unit 450 may automatically analyze the FOQA data to identify any problems to the aircraft or aircraft systems.

At step 6400, the aircraft flight data analysis management unit 450 may transmit the identified problems to the EFB 130 located on the aircraft 120 through the communication interface 480. The process may then go to step 6500 and end.

The aircraft flight data analysis management unit 450 may also transmit a solution to the identified problems to the EFB 130 located on the aircraft 120 for implementation. The implementation of the solution to the identified problems may include outputting the solution to at least one of the aircraft's pilot and crewmembers or automatically implementing the solution to the identified problems using the EFB 130, for example. The flight data collected from the aircraft 120 may be stored by the aircraft flight data analysis unit 450 in the aircraft flight data storage unit 140 for future analysis, trend setting, training, archiving, use or further analysis by a manager or technician, etc., for example. Alternatively, the flight data collected from the aircraft 120 in a recent time period or real-time may be sent directly or indirectly to a technician or manager for analysis and action.

Embodiments within the scope of the present disclosed embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations are part of the scope of the disclosed embodiments. For example, the principles of the disclosed embodiments may be applied to each individual user where each user may individually deploy such a system. This enables each user to utilize the benefits of the disclosed embodiments even if any one of the large number of possible applications do not need the functionality described herein. In other words, there may be multiple instances of the disclosed system each processing the content in various possible ways. It does not necessarily need to be one system used by all end users. Accordingly, the appended claims and their legal equivalents should only define the disclosed embodiments, rather than any specific examples given.

What is claimed is:

1. A method for using an Electronic Flight Bag (EFB) located on an aircraft to communicate Flight Operations Quality Assurance (FOQA) data to a remote aircraft flight data collection unit, comprising:

receiving FOQA data from one or more aircraft systems with an EFB while the aircraft is in-flight; and automatically transmitting the received FOQA data from the EFB to a remote aircraft flight data collection unit for analysis, the EFB displaying at least a plurality of pages of data that are stored in a reference library of the EFB, the plurality of pages of data comprising at least one of static, dynamic and interactive pages of data including flight checklists, aircraft operating manuals, navigation charts, and navigation publications for flight crewmember review during a particular phase of flight.

2. The method of claim 1, further comprising:
receiving, with the EFB, information concerning any identified problems related to the FOQA data from the remote aircraft flight data collection unit.

3. The method of claim 2, further comprising:
receiving, with the EFB, a solution to the identified problems from the remote aircraft flight data collection unit; and
implementing the received solution onboard the aircraft.

4. The method of claim 3, the implementing the received solution to the identified problems including displaying the received solution to at least one of the aircraft's pilot and other flight crewmembers on the EFB.

5. The method of claim 3, the implementing the solution to the identified problems including automatically implementing the received solution to the identified problems using the EFB.

6. A system for communicating Flight Operations Quality Assurance (FOQA) data from an aircraft to a remote aircraft flight data collection unit, comprising:
an Electronic Flight Bag (EFB) located on an aircraft;
a communication interface that connects the EFB to the aircraft for use and
an aircraft flight data interface unit that receives FOQA data from one or more aircraft systems while the aircraft is in-flight, and transmits the received FOQA data to the EFB via the communication interface for further communication from the EFB to a remote aircraft flight data collection unit for analysis, the EFB displaying at least a plurality of pages of data that are stored in a reference library of the EFB, the plurality of pages of data comprising at least one of static, dynamic and interactive pages of data including flight checklists, aircraft operating manuals, navigation charts, and navigation publications for flight crewmember review during a particular phase of flight.

7. The system of claim 6, the EFB receiving information concerning any identified problems related to the FOQA data from the remote aircraft flight data collection unit based on the analysis carried out by the remote aircraft flight data collection unit.

8. The system of claim 7, the EFB receiving a solution to the identified problems from the remote aircraft flight data collection unit and implementing the received solution onboard the aircraft.

9. The system of claim 8, the implementing the received solution to the identified problems including displaying the received solution to at least one of the aircraft's pilot and other flight crewmembers on the EFB.

10. The system of claim 8, the implementing the received solution to the identified problems including automatically implementing the received solution to the identified problems using the EFB.

11. A method for using a remote aircraft flight data collection unit to receive and collect aircraft Flight Operations Quality Assurance (FOQA) data from an Electronic Flight Bag (EFB) located on the aircraft, comprising:
providing an EFB onboard an aircraft;
receiving, with the EFB, FOQA data from the aircraft while the aircraft is in-flight;
transmitting the received FOQA data from the EFB to a remote aircraft flight data collection unit; and
receiving, with the EFB onboard the aircraft, information generated by the remote aircraft flight data collection unit automatically analyzing the FOQA data to identify any problems to the aircraft or aircraft systems, the EFB displaying at least a plurality of pages of data that are stored in a reference library of the EFB, the plurality of pages of data comprising at least one of static, dynamic and interactive pages of data including flight checklists, aircraft operating manuals, navigation charts, and navigation publications for flight crewmember review during a particular phase of flight.

12. The method of claim 11, further comprising:
receiving a solution to identified problems from the remote aircraft flight data collection unit with the EFB located the aircraft for implementation.

13. The method of claim 12, the implementation of the received solution to the identified problems including displaying the received solution to at least one of the aircraft's pilot and other flight crewmembers on the EFB.

14. The method of claim 12, the implementation of the received solution to the identified problems including automatically implementing the received solution to the identified problems using the EFB.

* * * * *